3,250,621
FROZEN GELS OF EUCHEUMA
Martin Glicksman, Valley Cottage, N.Y., assignor to General Foods Corporation, White Plains, N.Y., a corporation of Delaware
No Drawing. Filed Oct. 9, 1963, Ser. No. 314,866
3 Claims. (Cl. 99—131)

This application is a continuation-in-part of application Serial No. 115,902, filed June 9, 1961, and now abandoned.

This invention relates to the preparation of freeze-thawable gels derived from seaweeds of Eucheuma.

In the past gel systems save been prepared suitable for marketing in a refrigerated form. However, these gel systems have suffered from textural disadvantages, short shelf life, and syneresis upon thawing from the frozen state. These problems are even more acute when a gelatin-type gel is sought to be frozen and then thawed.

It would be highly desirable to produce a gel system capable of duplicating the texture of a gelatin gel which could be frozen and then thawed without undergoing deterioration.

It has now been descovered that a dry mix for use in making gels which do not undergo deterioration upon thawing from the frozen state can be produced from a mix comprising a sweetening agent, color, flavor and a gelling agent; said gelling agent consisting of a gelable extract of Eucheuma seaweed obtained at extraction temperatures of above 70° C.

This dry mix can be used to produce a milk gel or a water gel. In the case of a water gel a suitable amount of an edible organic food acid is employed to develop a solution pH of 2.5 to 4.7. This water gel of Eucheuma will simulate all of the desirable properties of a gelatin water gel.

The water gels of this invention include any acid-fruit flavored gel system wherein gelatin is normally used as the gelling agent. Among the acids which could be used are citric, adipic, fumaric, malic, tartaric and their acid salts. The seaweed extracts of Eucheuma may be employed in a buffered fruit-flavored mix and can be dissolved to provide a solution having a pH between 2.5 and 4.7 depending upon the particular acid or acid salt employed. It has been found that when the Eucheuma extract is substituted for the gelatin and the mix is placed in solution, the sol produced will set in a period of 30 minutes or less at room temperature (70° F.) depending upon the level of seaweed extract employed. Advantageously, the level of gelling agent that is necessary to produce a satisfactory gel in such short periods is substantially below that gelatin level of intermediate Bloom which must be employed to produce an equivalent gel strength. The gels produced can be frozen, held in the frozen state for a substantial period of time and thawed without material loss of texture. Refrigeration of the gel solution is not necessary to accelerate the on-set of gelation. Like gelatin mixes, the mix containing the Eucheuma extract dissolves in boiling water in a short period of time, usually less than a minute with stirring. Most important, however, is the remarkable similarity between the Eucheuma water gels and the gelatin water gels in appearance, texture and eating qualities. The Eucheuma-type water gel is short, breaks and readily dissolves in the mouth, is capable of offering a clarity and brilliance appealing to the eye and advantageously retains this gel shortness even when stored for periods of days. The mix solution is reasonably tolerant to water hardness and other salts such as sodium chloride which may be present in the mix or may be added by the housewife in some other recipe as table use dictates. Gelling systems were evaluated in hard water of 500–1000 grains per gallon hardness and while gels took somewhat longer to form in hard water and were softer, mixes containing such a colloidal extract of Eucheuma provided gels of an acceptable strength and shortness.

A preferred source of the gum for use in accordance with the present invention is the species of seaweed *Eucheuma muricatum*, although other species of the Eucheuma family may be employed such as *Eucheuma spinosum*, *Eucheuma cottonii*, *Eucheuma isiforme* and related species. These species are very common to coastal waters of Indonesia. The colloid is extracted from the source material by water extraction, preferably in a series of steps at progressively elevated temperatures. The seaweed is first washed free of extraneous matter and salts using cold water at a temperature of 25° C. and crushed. A gelling factor is then isolated from the seaweed residue by water extraction of the seaweed at temperatures in excess of 70° C.

It may be desirable to treat the washed seaweed preparatory to extraction in a salt solution in the manner described in U.S. Patent No. 2,811,451, issued October 29, 1957, to Sie Lian Tjoa, in order to isolate certain mucous systems from the seaweed at low temperatures in the neighborhood of 30–40° C., whereafter the seaweed residue is subjected to extraction at a more elevated temperature, typically in the range of 70–100° C., care being exercised to avoid excessive temperatures and treatment to avoid degradation of the gelling factor. Thus, a preferred gelling factor for use in accordance with the present invention is that described as "Stabilizer E" or "Stabilizer F" in the aforementioned U.S. Patent. A preferable process for recovering this useable gum factor is disclosed in Example 1 of said patent. The stabilizer found to be the most preferable for use in accordance with the present invention being Stabilizer E as defined in said U.S. patent.

This invention will now be more specifically described by reference to the following examples which shows a gelatin water gel compared to a Eucheuma water gel and a corn starch milk pudding compared to a Eucheuma milk pudding.

*Table I*

| Ingredients | Sample 1, gms. | Sample 2, gms. |
|---|---|---|
| Eucheuma Extract | | 6 |
| Gelatin | 10.0 | |
| Sugar | 80.0 | 80.0 |
| Trisodium Citrate | 0.8 | 0.8 |
| Adipic Acid | 3.0 | 3.0 |
| Flavor and Color | .03 | .03 |

*Table II*

| Ingredients | Sample 3, gms. | Sample 4, gms. |
|---|---|---|
| Eucheuma Extract | 5.0 | |
| Cornstarch | | 25.0 |
| Sugar | 55.0 | 55.0 |
| Dextrose | 16.7 | 16.7 |
| Flavor and Color | .05 | .05 |
| Salt | 0.5 | 0.5 |

The Sample 1 and 2 ingredients were mixed well and dissolved completely in 1 cup (8 oz.) of boiling water. Then 1 cup of cold water was added. The Sample 3 and 4 ingredients were combined with 2 cups (1 pint) of milk in a saucepan and cooked and stirred over medium heat until the mixture came to a boil. The solutions were then frozen in a 0° F. constant temperature room and removed after 24 hours. The gels were allowed to thaw at room temperature (75° F.) for about 4 hours and when completely thawed, were evaluated for syneresis and overall textural changes according to the following table.

*Table III*

| Sample | Percent Syneresis [1] | Texture [1] |
|---|---|---|
| Sample 1 | 5 | Very grainy, broken granular texture. |
| Sample 2 | 0 | Smooth, unbroken texture. |
| Sample 3 | 0 | Smooth, unbroken texture. |
| Sample 4 | 25 | Soupy, liquid texture. |

[1] ml. of water/total wt. of gel×100.

The Eucheuma samples clearly demonstrated the superior freeze-thawable characteristics of Eucheuma in a gelatin-like water gel system as well as in a milk pudding system.

While this invention has been described by specific examples, reference should be made to the appended claims for a definition of the scope of the invention.

What is claimed is:

1. A frozen gelatin-like water gel which does not undergo deterioration upon thawing comprising an organic food acid, sweetening agent, flavor, and color wherein said gel consists of a gelled solution of Eucheuma seaweed extract obtained at extraction temperatures of above 70° C.

2. The water gel of claim 1 wherein the pH of said gel is 2.5 to 4.7.

3. A frozen milk gel which does not undergo deterioration upon thawing comprising a sweetening agent, flavor, and color wherein said gel consists of a gelled milk solution of Eucheuma seaweed extract obtained at extraction temperatures of above 70° C.

References Cited by the Examiner

UNITED STATES PATENTS

| | | | |
|---|---|---|---|
| 2,809,893 | 10/1957 | Poarch et al. | 99—131 |
| 2,811,451 | 10/1957 | Tjoa | 99—131 |

OTHER REFERENCES

Whistler et al.: "Industrial Gums," 1959, Academic Press: New York, pp. 152–154.

A. LOUIS MONACELL, *Primary Examiner.*

J. M. GOLIAN, *Assistant Examiner.*